3,253,000
PREPARATION OF LIQUID EPOXIDES FROM POLYDIOLEFINS
Werner Kirchhof, Walter Stumpf, and Bernhard Schleimer, all of Marl, Germany, assignors to Chemische Werke Huls Aktiengesellschaft, Marl, Germany
No Drawing. Filed May 10, 1963, Ser. No. 279,623
Claims priority, application Germany, May 11, 1962, C 26,966
4 Claims. (Cl. 260—348)

This invention relates to the preparation of epoxidized polymers of diolefins, particularly to low viscosity epoxidized polybutadienes.

Such polydiolefins with over 50%, and even over 70% 1,4 configuration can be easily produced by known methods, as with the boron trifluoride etherate, the lithium-based catalysts, or Ziegler-type catalyst as disclosed, for example, in Gaylord and Mark, Linear and Stereoregular Addition Polymers, Interscience Publishers, New York and London, 1959. Suitable polydiolefins are, for example, 1,4-cis-polybutadiene, 1,4-trans-polybutadiene, 1,4-cis-trans-polybutadiene, 1,4-polychloroprene, 1,4-copolymers of butadiene and isoprene, and mixtures of these polymers. For still other examples, see Gaylord and Mark, id., Tables XII–7 and XII–11, in particular. These polymers usually contain different geometric isomers. Thus 1,4-cis-polybutadiene always contains some 1,4-trans- and small amounts of 1,2 polymers.

The polydiolefins of this invention also include copolymers of 1,3-dienes with monoolefins wherein the diene occurs predominantly as a 1,4 polymer. Examples of 1,3-dienes are butadiene and isoprene; and as examples of monoolefins are styrene, acrylonitrile, methacrylic acid esters.

The heterogeneous composition of the polyolefins which can be changed by varying the conditions under which they are produced, makes it possible to control the properties of the epoxidized polyolefins and of the resins produced therefrom, so as to suit special requirements. Thus, by changing the 1,4-cis and the 1,4-trans content of the polymer, it is possible to vary within wide limits the hardening time, the hardness, the brittleness, and the elasticity of the resins formed by the curing of these epoxides.

Epoxidation of the polydiolefins is effected by any method capable of epoxidizing a carbon to carbon double bond. For example, by the use of peracetic acid, epoxidation occurs at room temperature in a short time. (The shortness of the reaction time can be attributed to the fact that double bonds in mid-positions are more easily oxidized than vinyl double bonds.) Any of the other epoxidation methods can be used, including those found in the literature, such as those using $H_2O_2$ and formic acid. By suitable choice of reaction conditions, such as temperature and pH values, one can influence the formation of hydroxyl and ester groups during the epoxidation. For further information regarding epoxidation reactions, reference is directed to German Patent 1,058,987.

For the epoxidation of polymers produced by means of Ziegler catalysts, for example, the polymerization solution can be used directly, without the necessity of isolating the polymers, but preferably after washing out the catalyst. The degree of epoxidation depends on the conditions, as for example, the amount of epoxidizer present, and can be varied at will. The viscosity of the epoxidized products increases with the amount of epoxide oxygen.

It is surprising that the epoxides obtained with 1,4-polydiolefins have a significantly lower viscosity than those obtained with 1,2 polymers of even lower molecular weight. This means that with 1,4-polybutadiene, for example, it is possible to obtain much higher molar weights and/or higher epoxide oxygen contents while still obtaining a low viscosity polybutadiene epoxide. In that manner, more freedom is provided for the choice of properties suitable for the intended purposes.

The ensuing table, in which are listed the epoxides of 1,4-cis and 1,4-trans polybutadiene, together with a predominantly 1,2-polybutadiene, clearly demonstrates the advantages of the 1,4-polybutadiene epoxides.

The compositions of the listed polybutadienes are:

1,4-cis-polybutadiene: 70–90% 1,4-cis-, 10–30% 1,4-trans- and less than 2%, 1,2 polymers
1,4-trans-polybutadiene: <1,4-cis-, 80% 1,4-trans-, 20% 1,2 polymers

TABLE

|  | Molecular Weight | Epoxidized Polymers | | |
|---|---|---|---|---|
|  |  | Viscosity cp., 25° C. | Epoxide Oxygen, Percent | Total Oxygen, Percent |
| 1,4-cis-polybutadiene | 5,000 | 5,000 | 8.5 | 9.8 |
|  |  | 26,300 | 10.8 | 13.4 |
|  | 50,000 | 28,000 | 8.1 | 9.8 |
| 1,4-trans-polybutadiene | 4,000 | 342,000 | -------- | 10.75 |
| 1,2 polybutadiene | ca. 1,000 | 206,000 | 9 | 12.8 |

From the preceding table, it is seen that the employment of 1,4-cis-polybutadiene is the best way of carrying out this invention, since it results in low viscosity liquids having high molecular weights as well as high epoxide contents. For the purposes of this invention, 1,4-cis-polybutadiene is defined to contain at least 70% of the 1,4-cis configuration.

For maintaining the necessary workability, the viscosity of the epoxidized 1,4-polydiolefins should not exceed about 1,000,000 cp. at 25° C. This requirement can be easily satisfied with 1,4-cis- as well as with 1,4-trans-polybutadiene, even with a high degree of epoxidation. It is, however, also possible to obtain a viscosity of less than 1,000,000 cp. (at 25° C.) by mixing an epoxidized polydiolefin consisting mainly of 1,4, but also with some 1,2 polymers, and having a viscosity above 1,000,000 cp. (at 25° C.) with an epoxidized polydiolefin having a lower viscosity, in such proportions that the mixture has a viscosity of less than 1,000,000 cp. (at 25° C.).

These epoxides can be hardened by known methods, using acids, bases, or radical-forming substances. It has been further found that the epoxides of 1,4-polydiolefins can be cured to hard resins at substantially lower temperatures than the epoxides of 1,2-polydiolefins. The conditions necessary for setting the resin can be controlled within wide limits by suitable choice of the degree of epoxidation and of the relative amounts of 1,4-cis- and 1,4-trans- polymers.

The curable resins of this invention are thus useful for a wide variety of applications, such as adhesives, protective coatings, and shaped objects.

Without further elaboration it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

It is also to be noted that the viscosities as reported in the examples, as well as in the remainder of the specification and claims, are measured by a falling ball viscosimeter.

*Example 1*

Into a 2-liter, 3-necked agitated flask which has been flushed with oxygen-free nitrogen and which contains 500 ml. anhydrous benzene and 500 ml. anhydrous pentane, there is added at room temperature in succession 4.96 g. (40 millimoles) ethyl aluminum sesquichloride and a solution of 10 millimoles nickel-II-diacetylacetonate in benzene. This mixture is heated to 90° C., and 400 g. (7.4 moles) of gaseous butadiene are then introduced in the course of 5 hours. After another hour, the catalyst is decomposed by the introduction of 100 ml. methanol; and the benzene and alcohol are then distilled off by the use of a water aspirator. The liquid residue is washed twice with 500 ml. methanol to remove the catalyst residue. The methanol phase is then decanted from the heavier polybutadiene phase. Finally, the liquid polybutadiene is freed from the residual benzene and methanol by drying in a vacuum drying chamber at 30–40° C., under a nitrogen atmosphere.

320 g. (80% of the theoretical) of a clear liquid polybutadiene with a molecular weight of 5000±500 were obtained. It had a viscosity of 140 cp. at 50° C., and a density of 0.8923 50°/4°. Analysis by infrared spectra indicated 74% cis-, 25% trans-, and 1% vinyl double bonds.

Into a solution of 50 g. of this 1,4-cis-polybutadiene in 200 ml. benzene, there was added 120 ml. of a 21.7% by weight solution of peracetic acid in ethyl acetate, dropwise, during the course of 20 minutes and at 20–25° C. with constant stirring. After about 3 hours, the reaction terminated, and the resulting product was then washed with water and neutral bicarbonate solution; and then dried. The solvents were distilled off, and there remained 42 g. of liquid 1,4-cis-polybutadiene epoxide containing 8.5% epoxide oxygen, 0.6% hydroxyl oxygen, and 9.8% total oxygen. Its viscosity is 5000 cp. (at 25° C.).

Another 50 g. of the 1,4-cis-polybutadiene is expoxidized in the manner just described, but instead of 120 ml. of the peracetic solution, there was used 180 ml. The 50% increase in epoxidizing solution yielded 1,4-cis-polybutadiene epoxide containing 10.8% epoxide oxygen, 0.6% hydroxyl oxygen, 13.4% total oxygen, and a viscosity of 26,300 cp. (at 25° C.).

*Example 2*

Into a 4-liter, 3-necked agitated flask which has been flushed with oxygen-free nitrogen and which contains 2500 ml. anhydrous benzene, there is added at room temperature in succession 12.4 g. (100 millimoles) ethyl aluminum sesquichloride and a solution of 25 millimoles nickel-II-diacetylacetonate in benzene. After bringing the solution to 30° C., there was conducted into it 1000 g. (14.8 moles) of gaseous butadiene during the course of 5 hours. After another hour, the catalyst was decomposed by the addition of 100 ml. methanol; the benzene and alcohol were then distilled off by the use of a water aspirator. The liquid residue was then washed twice with 1000 ml. methanol to remove the catalyst residue. The methanol phase was then decanted from the heavier polybutadiene phase. Finally, the liquid polybutadiene was freed from adhering benzene by drying under nitrogen in a vacuum dryer at 30–40° C.

850 g. (85% of the theoretical) of a clear liquid polybutadiene with a molecular weight of 50,000±5,000 were obtained, having a viscosity of 1610 cp. measured at 50° C., and a density of 0.8875, 50°/4°. Analysis by infrared spectra indicated 88% cis-, 10% trans-, and 2% vinyl double bonds.

50 g. of this 1,4-cis-polybutadiene were then epoxidized as in Example 1 with 115 ml. of a 22.6% solution of peracetic acid. The epoxide thus produced contained 8.1% epoxide oxygen, 1% hydroxyl oxygen and 9.8% total oxygen. The viscosity was 28,000 cp. (at 25° C.).

*Example 3*

Into a 2-liter, 3-necked flask, 1000 ml. isopropyl cyclohexane were introduced as a diluent, in which was then suspended 47.2 g. (0.32 mole) boron trifluoride etherate and 2.88 g. (0.16 mole) water. 500 g. of gaseous butadiene at 0° C. were then introduced within 5 hours with vigorous stirring, after which the stirring was continued for another quarter hour. Finally, 100 ml. methanol were added, and the reaction products were transferred to a separatory funnel and shaken out twice with 1 liter methanol and then with 1 liter water to remove the catalyst residue. The lower organic phase was dissolved in petroleum ether and dried. After distilling away the solvent, there remained a colorless liquid polybutadiene of molecular weight 4000, viscosity 314 cp. (50° C.) and a density of 0.9187 50°/4°. Analysis by infrared spectra indicated 80% 1,4-trans- and 20% of 1,2 double bonds.

50 g. of the 1,4-trans-polybutadiene are dissolved in 200 ml. benzene and 115 ml. of a 22.6% solution of peracetic acid in ethyl acetate at 20° C., were added dropwise during 30 minutes with constant stirring. After the peracetic acid was nearly used up, the reaction was interrupted, and the reaction mixture washed with water and bicarbonate and dried. After distilling away the solvent, there remained a liquid 1,4-trans-polybutadiene epoxide with a total oxygen content of 10.75%, and a viscosity of 342,000 cp. (25° C.).

*Example 4*

2.5 g. 1,4-cis-polybutadiene epoxide (8.3% epoxide oxygen and viscosity 6500 cp. at 25° C.), 2.5 g. 1,4-trans-polybutadiene epoxide (8.6% total oxygen and viscosity 1,500,000 cp. at 25° C.), and 0.4 g. propylene glycol were mixed and warmed to 50° C. Into this mixture were stirred 1.55 g. maleic acid anhydride at 55° C. The mixture was spread out on a glass plate and was hardened for 1 hour at 80° C. and for another hour at 120° C. A very hard, but not brittle, resin was obtained.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An epoxypolybutadiene polymer of polybutadiene comprising 70 to 90% 1,4-cis-polybutadiene, 10 to 30% 1,4-trans-polybutadiene and less than 2% 1,2-polybutadiene having a molecular weight 5,000 to 50,000, said epoxy-polybutadiene having an epoxy oxygen content of 8.1–10.8% by weight of polymer and a viscosity of 5,000 to 28,000 centipoise at 25° C.

2. An epoxy polybutadiene polymer of polybutadiene comprising 70 to 90% 1,4-cis-polybutadiene, 10 to 30% 1,4-trans-polybutadiene, and less than 2% 1,2-polybutadiene having a molecular weight of 50,000, an epoxy oxygen content of 8.1% by weight of polymer, and a viscosity of 28,000 centipoise at 25° C.

3. An epoxy polybutadiene polymer of polybutadiene comprising 70 to 90% 1,4-cis-polybutadiene, 10 to 30% 1,4-transpolybutadiene, and less than 2% 1,2-polybutadiene having a molecular weight of 5,000, an epoxy oxygen content of 8.5% by weight of polymer, and a viscosity of 5,000 centipoise at 25° C.

4. An epoxy polybutadiene polymer of polybutadiene comprising 70 to 90% 1,4-cis-polybutadiene, 10 to 30% 1,4-trans-polybutadiene, and less than 2% 1,2-polybutadiene having a molecular weight of 5,000, an epoxy oxygen content of 10.8% by weight of polymer, and viscosity of 26,300.

References Cited by the Examiner

UNITED STATES PATENTS 2,949,441  8/1960  Newey _____ 260—348.5
3,030,336  4/1962  Greenspan et al. ____ 260—348.5

OTHER REFERENCES

Fitzgerald, C. G., et al., SPE Journal, volume 13 (1957), pp. 22–24.

WALTER A. MODANCE, *Primary Examiner.*
NICHOLAS S. RIZZO, *Examiner.*